United States Patent Office 3,216,885
Patented Nov. 9, 1965

3,216,885
PRINTING INK COMPRISING CARBOXYLIC ACID MODIFIED POLYETHYLENE WAX
Gretchen S. Schaufelberger, Metuchen, N.J., assignor to Union Carbide Corporation, a corporation of New York
No Drawing. Filed Jan. 3, 1962, Ser. No. 164,186
10 Claims. (Cl. 161—252)

This invention relates to novel printing ink compositions. More particularly, the invention relates to printing ink compositions exhibiting excellent adhesion to polyethylene surfaces even without pretreatment of the surface.

The rapid growth of polyethylene as a packaging material e.g. for packaging film, packaging material coatings and molded containers such as bottles, especially blow molded bottles, has stimulated much research into means for printing thereon descriptions of package contents and directions for use thereof and brand identification.

Efforts have heretofore in large measure been directed toward modification of the polyethylene itself e.g. by irradiation, chemical treatment or coating to make the polyethylene surface receptive to, i.e. adhesive to, known printing inks.

This approach has the disadvantage of requiring an extra polyethylene treating step which increases costs.

It is a chief object, therefore, of the present invention to provide means for printing on treated or even untreated polyethlene surfaces.

It is another object to provide printing inks adhesive to polyethylene surfaces.

Other objects will appear hereinafter.

It has now been discovered, in accordance with the present invention, that these and other objects are achieved with a printing ink composition containing as the essential ingredients a resinous vehicle comprising in major proportion i.e. over 50% by weight a carboxylic reagent modified ethylene polymer wax and a coloring compound selected from the group consisting of dyes and pigments.

In particular, it has been found that printing inks comprising dyes or pigments and the above-mentioned resinous vehicle adhere tenaciously even to an untreated surface of both low and high density polyethylene substrates, e.g. self-sustaining polyethylene films, polyethylene coatings on various substrates, and rigid and semi-rigid polyethylene articles.

The term "ethylene polymers" as used throughout the present specification and claims refers to normally solid polymers, e.g. polymers having molecular weights above about 10,000, for example, homopolymers, especially ethylene homopolymers, and copolymers, especially with ethylene, of compounds containing the ethylene, >C=C<, linkage e.g. styrene, vinyl stearate, propylene, butene, vinyl acetate, vinyl formate, methyl acrylate, ethyl acrylate, monobutyl maleate, 2-ethylhexyl acrylate, N-methyl-N-vinyl-acetamide, acrylic acid, isoprene, butadiene, acrylamide, vinyl triethoxysilane, bicylcoheptene, bicycloheptadiene and divinyl phosponate and the like.

By the term "carboxylic reagent" as used throughout the present specification and claims is meant an organic compound containing at least one carboxyl (—COOH) group and selected from the group consisting of unsaturated monocarboxylic acids having from 3 to 6 carbon atoms, e.g. acrylic acid, crotonic acid, sorbic acid and the like; unsaturated dicarboxylic acids having from 4 to 10 carbon atoms, e.g. maleic acid, tetrahydrophthalic acid, fumaric acid, glutaconic acid, itaconic acid, and the like; and carboxylic acid anhydrides, such as anhydrides of the foregoing acids, and especially of the unsaturated dicarboxylic acids e.g. maleic anhydride. All of these carboxylic reagents are capable of undergoing an addition reaction to one or more olefinic linkages occurring in polyethylene waxes.

In general, the printing ink compositions of the present invention are prepared in the same manner as conventional printing inks only using as the resinous vehicle the carboxylic reagent modified ethylene polymer waxes described herein.

Typical preparative techniques include fine grinding the modified wax e.g. in a micropulverizer, micronizer or pebble mill, and blending with one or more pigments or dyes and other modifiers and conventional ink ingredients if desired, in any convenient manner. These mixtures can then be homogenized to a fine particle size paste by grinding e.g. on a two-roll mill. The paste is then let down to the desired viscosity by addition of some liquid, e.g. organic solvents such as aromatic hydrocarbons. Alternatively, the modified wax and pigment or dye can be pre-blended, e.g. by fluxing the modified wax on a two-roll mill, gradually adding and grinding in the pigment or dye and removing the blend obtained as a sheet or "pigment chip." Or a pre-blend can be made by incorporating the pigment or dye in a melt of the modified wax, as simple as by stirring to homogeneity, allowing the melt to cool and then handling as a pigment chip. If desired and advantageously with the modified waxes herein described, an aqueous emulsion of the wax can be prepared and the emulsion blended with the pigment or dye. Preferably the pigment or dye is then added in some compatible liquid medium, e.g. water or alcohol. Also the pigment chips described above can themselves be emulsified and thus made into inks. In each of the foregoing techniques the conventional additives and modifiers for ink formulation are added to the ink in the usual amounts to provide various specific properties. These additives and modifiers include among others fillers, modifying resins, driers, liquid carriers, flow control agents, and leveling agents.

The coloring compounds used in the ink compositions of the present invention are dyes and pigments. Examples of these compounds are pigments such as cadmium yellow, cadmium red, cadmium maroon, black iron oxide, titanium dioxide, chrome green, gold, silver aluminum and copper; and dyes such as alizarine red, Prussian blue, auramin naphthol, malachite green and the like. Ordinarily the pigment or dye will be present in a weight ratio of from about 1:1 or less to about 3:1 or more of pigment to modified wax solids.

The choice of the final ink formulation apart from the essential use of a pigment or dye and the essential use of the modified wax herein described as a major part of the resinous vehicle of the ink is widely variable and will be determined by the viscosity characteristics required by the particular printing method in which the ink is to be used. For example, flexographic inks, which are used to print on film have low viscosities e.g. 22–25 seconds measured by a #2 Zahn cup, but silk screen inks, typically used to print on bottles and other containers have very high viscosities e.g. 25,000 centipoises on a Brookfield viscometer.

The carboxylic reagent modified ethylene polymer waxes used in the present invention are prepared in general by the method disclosed in U.S. Patent 2,142,980 to Huisjer which is herewith incorporated by reference. Polyethylene waxes are typical of the ethylene polymer waxes herein contemplated and their modification with carboxylic reagents will be discussed in some detail. The waxes are conveniently obtained by the pyrolysis or thermal degradation of high molecular weight polyethylenes having densities of from 0.88 to 0.97 and higher. Preferably the polyethylene to be pyrolyzed is substantially linear and has a density of 0.94 to 0.97 as these pyrolysis products after modification provide inks exhibiting the best adhesion. The pyrolysis is conveniently carried out in a heated pyrolysis tube at about 450°–600° C. but can be effected in any known manner. The product waxes range in molecular weight from 1000 to about 5000, and preferably from 1500 to 5000.

In a preferred method of preparing the modified polyethylene waxes, a polyethylene wax having a density above about 0.94 and a molecular weight of from about 1500 to 5000 is blended in the liquid phase, i.e., in the melt or in solution with from 1 to 25% by weight of a carboxylic reagent, e.g. maleic anhydride, and reacted by being agitated therewith at temperatures of from about 130° C. to about 250° C. and preferably above 180° C. With lower density polyethylene waxes, reaction temperatures of 80° C. and above are suitable. What is required is that the reaction mixture be agitatable. The blending and agitation can be carried out in any manner which insures intimate commingling of the reactants and good heat transfer throughout the reaction mass during the reaction time. For example, the polyethylene wax can be dissolved in an inert liquid organic solvent for the wax and carboxylic reagent such as toluene, xylene, cyclohexane, methylcyclohexane, iso-octane and chlorinated hydrocarbon solvents such as ortho-dichlorobenzene, 1,1,2-trichloroethane and α-chloronaphthalene. The dissolving of the polyethylene wax is most conveniently accomplished at temperatures above 110° C. in aromatic solvents, for higher density of polyethylenes.

It is preferred to effect reaction in the melt in the absence of an organic solvent by heating a high density polyethylene wax to its melting point (ca. 130° C.) and above, e.g. to 180° C. and stirring in from 5 to 15%, based on the wax, of carboxylic reagent e.g. maleic anhydride and continuing heating for 60–90 minutes. Temperatures of reaction either in solution or in the melt above about 250° C. confer no added benefit in speed of reaction or quality of modified wax obtained and, hence, will not be ordinarily used. The modification reaction can be effected under pressure to prevent undue volatilization of carboxylic reagent. The viscosity of the melted polyethylene waxes, e.g., 250–1000 centipoises at 200° C. is such that rapid stirring of the carboxylic reagent is easily accomplished. The exact manner or order of addition of the reactants is not critical. Any excess carboxylic reagent is removed after the reaction as by vacuum distillation or like technique.

Alternatively and advantageously the criticalities of hot melt or solution application or incorporation can be avoided by use of an anionic, cationic or non-ionic emulsion of the modified wax as the coating mixture. Typically anionic water emulsions are prepared by melting together the carboxylic reagent modified polyethylene wax and a fatty acid such as, for example, formic, acetic, propionic, butyric, valeric, caproic, enanthylic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isocrotonic, vinylacetic, methylacrylic, tiglic, angelic, senecioic, hexenic, teracrylic, hypogeic, oleic, elaidic, erucic, brassidic, propiolic, propynoic, tetrolic, 2-butynoic pentinoic, 2-pentionoic, amylpropiolic, palmitotic, stearolic, behenolic, sorbic, linoleic and linolinic acids and the like.

These acids have the general formula $$C_nH_{2n+(x)}COOH$$

wherein $n$ is an integer from 0 to 32 and $x$ is an odd number from $-5$ to $+1$ with the proviso that when $n=0$, $x=+1$. An amine soap is then added such as mono- and triethanolamine, monoisopropanolamine, diisopropanolamine, triisopropanolamine, morpholine, N, N-dimethylethanolamine and N,N-diethylethanolamine. The mixture is stirred until thoroughly mixed or until it becomes clear. Water which has been heated to about 130° C. under pressure is added. Pressure being maintained the mixture is then vigorously agitated in a suitable device, e.g. a bladed mixer, colloid mill or other shear producing apparatus to form the emulsion. A carboxylic reagent modified polyethylene wax solids content of from 5 to 50% is preferred in emulsions to be used in the ink compositions of this invention.

The water emulsion of the maleic anhydride modified wax is readily mixed with aqueous and alcoholic pigment or dye solutions and this mixture is easily coated onto or printed on a substrate by any of the conventional techniques. The liquid of the emulsion is evaporated either by allowing the emulsion to stand at room temperature or preferably by force drying as by air movement around and/or application of heat to the emulsion. Upon drying there remains a non-tacky and non-blocking colored coating which is tenaciously adherent to polyethylene and numerous other materials.

A particularly desirable use of the ink compositions, of the present invention is in simultaneously rendering more attractive and more polyethylene adherent the substrates used in "skin packaging," the formation of contoured containers for odd-shaped objects by drawing a vacuum on deformable film e.g. through holes in the surface of a relatively flat and rigid substrate member to bring the film over and around the object to be packaged. The film clings on contact and thereby simultaneously anchors and protects the packaged object. This packaging technique is described in U.S. Patent 2,885,735 to Groth, for example. It is, of course, essential to obtain great adhesion between the film and the relatively rigid substrate member. The present invention provides a means for securing this desired adhesion by printing on or coating the film or substrate with the inks of this invention to promote adhesion as well as decorate the substrate. Heretofore, conventional printing inks have required use of an adhesive layer between the ink and the film. The printing ink compositions of this invention obviate the extra step by being themselves adherent to both substrate and polyethyelne film.

The following examples illustrate the practice of the present invention. All parts and percentages are by weight unless otherwise stated.

*Examples 1–6*

Isopropanol and TiO$_2$ were added to a ball mill in proportions so as to provide a 50% solids dispersion of the pigment in the isopropanol. The materials were ground for 72 hours.

A maleic anhydride modified polyethylene wax was prepared by extruding a 0.96 density resin from a screw extruder through a hot tube 48 inches in length, having a diameter of 3 inches and fitted with an axially positioned 2⅞ inch diameter torpedo, at a rate of 32 pounds per hour. The torpedo was heated to 425° C.

Sixty pounds of the resulting wax was reacted with 6 pounds of maleic anhydride for 90 minutes at 220° C. in a 15 gallon autoclave equipped with a Dowtherm jacket and a 6 inch turbine agitator. The reaction product was recovered by stripping the excess maleic anhydride under 5 mm. Hg pressure and removing the reaction product. The modified wax contained over 3% carboxyl (calculated as succinic acid) and had a viscosity of about 500 centipoises at 140° C.

One hundred grams of the above prepared modified wax was mixed with 20 grams of morpholine, 20 grams of oleic acid and 300 grams of water. The mixture was charged to a pressure reaction vessel and heated to 150° C. with agitation for ½ hour and immediately cooled. There was obtained a white emulsion having a solids content of 31.9%.

The pigment/isopropanol paste prepared above was added to the 30% solids modified polyethylene wax emulsion in ratios of paste to emulsion of 0.5:1 (Example 1)
        1:1 (Example 2)
        1.5:1 (Example 3)
        2:1 (Example 4)
        2.5:1 (Example 5)
        3:1 (Example 6)

Mixing was by manual stirring. The six inks thus prepared were applied to each of two polyethylene films "A" a 5 mil film of 0.918 density, 1.7–2.4 melt index polyethylene and, "B" a 10 mil film of 0.96 density, 0.8–1.2 melt index polyethylene. Films had been given no previous treatment to promote coatings adhesion. Application was by means of a wire wound rod. Final ink coating thicknesses were either 0.05 mil ("I") or 0.10 mil ("II"). The low density "A" coated films of both "I" and "II" coating thickness were baked for 15 minutes at 180° F. The high density "B" coated films of both "I" and "II" coating thickness were baked for 15 minutes at 225° F. Upon cooling, each of the coated film samples was tested for ink adhesion first by laminating "Scotch" brand cellophane tape with hand pressure to the coated film surface and stripping it from the surface and second by drawing an abrasive scribe across the coated film surface. Results were as follows.

| Example | Scotch Tape Test | Scribe Test |
|---|---|---|
| 1A I | No ink lift off | No scratch. |
| 1A II | do | Do. |
| 1B I | do | Do. |
| 1B II | do | Do. |
| 2A I | do | Do. |
| 2A II | do | Do. |
| 2B I | do | Do. |
| 2B II | do | Do. |
| 3A I | do | Do. |
| 3A II | do | Do. |
| 3B I | do | Do. |
| 3B II | do | Do. |
| 4A I | do | Do. |
| 4A II | do | Do. |
| 4B I | do | Do. |
| 4B II | do | Do. |
| 5A I | do | Do. |
| 5A II | do | Do. |
| 5B I | do | Do. |
| 5B II | do | Do. |
| 6A I | do | Do. |
| 6A II | do | Do. |
| 6B I | do | Do. |
| 6B II | do | Do. |

In summary, none of the ink coatings were scratched. This shows the tremendous abrasion resistance of the printing ink compositions of this invention. None of the ink coatings were taken up by the Scotch tape upon its removal using a quick vertical pull showing the tenacious adhesion of the printing ink compositions of this invention. The above described ink coatings were easily buffed to a very high gloss.

*Examples 7–12*

Examples 1–6 were repeated but employing as the pigment 50% solids dispersion of $TiO_2$ in water prepared by grinding the $TiO_2$ and water in a ball mill for 72 hours. Results of the tests are given below.

Ratios of $TiO_2$ to $H_2O$ were 0.5:1 Example 7
        1:1 Example 8
        1.5:1 Example 9
        2:1 Example 10
        2.5:1 Example 11
        3:1 Example 12

Again "A"=the low density polyethylene; "B"=the high density polyethylene "I"=a 0.05 mil coating and "II"=a 0.10 mil coating. Films again were not pretreated.

| Example | Scotch Tape Test | Scribe Test |
|---|---|---|
| 7A I | No ink lift off | No scratch. |
| 7A II | do | Do. |
| 7B I | do | Do. |
| 7B II | do | Do. |
| 8A I | do | Do. |
| 8A II | do | Do. |
| 8B I | do | Do. |
| 8B II | do | Do. |
| 9A I | do | Do. |
| 9A II | do | Do. |
| 9B I | do | Do. |
| 9B II | do | Do. |
| 10A I | do | Do. |
| 10A II | do | Do. |
| 10B I | do | Do. |
| 10B II | do | Do. |
| 11A I | do | Do. |
| 11A II | do | Do. |
| 11B I | do | Do. |
| 11B II | do | Do. |
| 12A I | do | Do. |
| 12A II | do | Do. |
| 12B I | do | Do. |
| 12B II | do | Do. |

These examples demonstrate that water is an effective pigment vehicle as well as the low molecular weight alcohols, such as isopropanol.

*Examples 13–14*

The 50% solids dispersions of $TiO_2$ in isopropanol and water prepared in Examples 1 and 7 respectively were each added to the modified wax aqueous emulsion of Example 1 at ratios of 3:1 Example 13
        3:2 Example 14

Coating and testing were carried out as in Examples 1–12. Results were as follows

| Example | Scotch Tape Test | Scribe Test |
|---|---|---|
| Isopropanol Dispersion (Example I): | | |
| 13A I | No ink lift off | No scratch. |
| 13A II | do | Do. |
| 13B I | do | Do. |
| 13B II | do | Do. |
| 14A I | do | Do. |
| 14A II | do | Do. |
| 14B I | do | Do. |
| 14B II | do | Do. |
| Water Dispersion (Example 7): | | |
| 13A I | do | Do. |
| 13A II | do | Do. |
| 13B I | do | Do. |
| 13B II | do | Do. |
| 14A I | do | Do. |
| 14A II | do | Do. |
| 14B I | do | Do. |
| 14B II | do | Do. |

These examples demonstrate that widely varying ratios of pigment to modified wax can be employed with equal success.

*Examples 15–24*

A number of ethylene polymers were pyrolyzed by the method described in Example I with varying severity to produce a variety of waxes. Obtained were;

Example 15, polyethylene wax having a density of 0.928 and a viscosity at 140° C. of 330 centipoises.

Example 16, was of the same polyethylene as Example 15; viscosity was 2,800–3,100 centipoises.

Example 17, polyethylene wax having a density of 0.91 and a viscosity at 140° C. of 75 centipoises.

Example 18, polypropylene wax having a viscosity at 140° C. of 240 centipoises.

Example 19, polypropylene wax having a viscosity at 140° C. of 3,680 centipoises.

Example 20, polyethylene wax having a density of 0.918 and a viscosity at 140° C. of 250–315 centipoises.

Example 21, ethylene/ethyl acrylate copolymer wax (15% ethyl acrylate) having a viscosity at 140° C. of 330 centipoises.

Example 22, copolymer wax of Example 21 having a viscosity at 140° C. of 3,100 centipoises.

Example 23, polyethylene wax having a density of 0.95 and a viscosity at 140° C. of 230–320 centipoises.

Example 24, polyethylene wax having a density of 0.920 and a viscosity at 140° C. of 2,400 centipoises.

Each of the foregoing modified ethylene polymer waxes was emulsified and pigment dispersion added as in Example 1 and then each was coated onto low density polyethylene film "A" (0.918 density 1.7–2.4 melt index) and high density polyethylene film "B" (0.96 density; 0.8–1.2 melt index) at thickness of 0.05 mil ("I") and 0.10 mil ("II") and baked and tested for adhesion all in the manner of Example 1. Results of the adhesion tests with each of the inks showed them all to be superior to commercial flexographic inks in adhesiveness to polyethylenic substrates.

*Examples 15A–24A*

Maleic acid modified waxes of the polymer of Examples 15–24 are tested and found to provide adhesion and abrasion resistance equal to maleic anhydride modified wax.

*Examples 25–27*

In these examples the $TiO_2$ pigment was blended with the modified polyethylene wax by stirring the pigment into a melt of the wax. Blends of 3:1 (Example 25) 3:2 (Example 26) and 1:1 (Example 27) of pigment to wax were prepared. These blends were then emulsified in the manner of Example 1 except that the pigment was in the wax and in Examples 26 and 27, 250 and 200 parts of blend were used, respectively. Three emulsions containing 54% solids (2:1 pigment: resin ratios) and 37% solids (1:1 pigment: resin ratio) were appleid to "A" and "B" polyethylenes in "I" and "II" thickness baked and tested all in the manner of Example 1. Adhesion and abrasion resistance were equivalent to what was obtained in Example 1.

The ink formulations described herein can be used in the dual role of obtaining decorative effects and promoting adhesion of polyethylene films to normally nonadherent substances.

*Examples 28–30*

In these examples corrugated paperboard (Example 28), clay coated paperboard (Example 29) and patent coated paperboard (Example 30) were printed on with each of the three inks of Examples 25–27. The so printed paperboards were then employed as the relatively rigid substrate in skin packaging. Ordinarily in skin packaging, an adhesive primer placed on the printed or decorated paperboard substrate and activated by the heat of the packaging film accomplishes the bonding. In these examples no adhesive primer was applied to the film or the paperboard substrate, in order to demonstrate that the modified polyethylene wax vehicle printing ink of the present invention promoted bonding. The articles packaged were plastic bottle caps. The packaging film was heated by radiant means for 5–8 seconds until it began to soften. This film was vacuum drawn over the cap and paperboard substrate in the known manner. Vacuum was maintained for 5 seconds. After the assembly cooled, adhesion was inspected by lifting the film from the substrate. Wherever the film contacted the printing ink of the invention, tenacious adhesion between the film and the paperboard substrate developed as evidenced by deep paper failure when the film was lifted from the substrate.

In a control experiment the above procedure was duplicated but using a presently available commercial printing ink. The film parted easily from the paperboard substrates with no fiber failure occurring.

Similarly "blister packaging" the encapsulation of odd shaped objects between a preformed "bubble" of relatively rigid film and a relatively rigid substrate member can be improved by the use of polyethylene film or sheeting as the bubble and modified ethylene polymer wax containing printing ink at the interface of the film or sheeting and the substrate.

*Example 31*

A solution of the maleic anhydrides modified polyethylene wax of Example 1 in toluene is mixed with a solution of an organic dye in toluene and the mixture applied to polyethylene sheet. The ink is air dried. Adhesion is excellent.

*Example 32*

An emulsion prepared as in Example 1 is blended with (a) a water soluble dye and (b) an oil soluble dye and the mixtures applied and tested as in Example 1. Adhesion is excellent.

What is claimed is:

1. Method for printing on polyethylene which includes the steps of printing on a polyethylene surface a composition containing a resinous vehicle comprising in major proportion an ethylene polymer wax which has been modified by being reacted with a carboxylic reagent selected from the group consisting of unsaturated monocarboxylic acids having from 3 to 6 carbon atoms, unsaturated dicarboxylic acids having from 4 to 10 carbon atoms, and anhydrides of the foregoing carboxylic acids, and a coloring compound selected from the group consisting of dyes and pigments, and drying the composition.

2. Printing ink composition characterized by tenacious adhesion to polyethylene surfaces and containing a resinous vehicle comprising in major proportion an ethylene polymer wax which has been modified by being reacted with a carboxylic reagent selected from the group consisting of unsaturated monocarboxylic acids having from 3 to 6 carbon atoms, unsaturated dicarboxylic acids having from 4 to 10 carbon atoms, and anhydrides of the foregoing carboxylic acids, and a coloring compound selected from the group consisting of dyes and pigments.

3. Printing ink composition claimed in claim 2 wherein the ethylene polymer wax is a polyethylene wax having a density from about 0.88 to about 0.97 and a molecular weight from 1000 to 5000.

4. Printing ink composition claimed in claim 3 wherein the carboxylic reagent is maleic anhydride.

5. Printing ink composition claimed in claim 4 wherein the coloring compound is a pigment.

6. Printing ink composition claimed in claim 2 wherein the ethylene polymer wax is a polyethylene wax having a density from about 0.94 to about 0.97 and a molecular weight from 1500 to 5000.

7. Printing ink composition characterized by tenaceous adhesion to polyethylene surfaces comprising a resinous vehicle of an aqueous emulsion of polyethylene wax having a density of 0.94 to 0.97 and a molecular weight of from 1500 to 5000 which has been modified by being reacted with a carboxylic reagent selected from the group consisting of unsaturated monocarboxylic acids having from 3 to 6 carbon atoms, unsaturated dicarboxylic acids having from 4 to 10 carbon atoms, and anhydrides of the foregoing carboxylic acids, and a pigment.

8. Printing ink composition claimed in claim 7 wherein the carboxylic reagent is maleic anhydride.

9. The combination of an article having a polyethylene surface and on the polyethylene surface a printing ink comprising a resinouous vehicle and a coloring compound selected from the group consisting of dyes and pigments said resinous vehicle comprising an ethylene polymer wax which has been reacted with a carboxylic reagent selected from the group consisting of unsaturated monocarboxylic acids having from 3 to 6 carbon atoms, unsaturated dicarboxylic acids having from 4 to 10 carbon atoms, and anhydrides of the foregoing carboxylic acids.

10. A laminate comprising a film of polyethylene and a substrate and at their interface a layer of a printing ink composition comprising a resinous vehicle and a coloring compound selected from the group consisting of dyes and pigments said resinous vehicle comprising an ethylene polymer wax which has been reacted with a carboxylic reagent selected from the group consisting of unsaturated monocarboxylic acids having from 3 to 6 carbon atoms, unsaturated dicarboxylic acids having from 4 to 10 carbon atoms, and anhydrides of the foregoing carboxylic acids.

References Cited by the Examiner

UNITED STATES PATENTS

| | | | |
|---|---|---|---|
| 2,142,980 | 1/39 | Huijser et al. | 260—85.3 |
| 2,612,480 | 9/52 | May. | |
| 2,679,969 | 6/54 | Richter | 161—231 |
| 2,874,137 | 2/59 | Pisanchyn | 260—29.6 |
| 2,879,238 | 3/59 | De Groote et al. | 260—29.6 |
| 2,990,389 | 6/61 | Frump | 260—29.6 |
| 3,144,348 | 8/64 | Turbett | 260—29.6 |

OTHER REFERENCES

Raff and Allison: "Polyethylene," vol. XI, 1954, pp. 440–442, Interscience Publishers, Inc., 250 5th Ave., New York 1, N.Y.

WILLIAM H. SHORT, *Primary Examiner.*

LEON J. BORCOVITZ, *Examiner.*